(12) United States Patent
Perlee

(10) Patent No.: US 11,076,942 B2
(45) Date of Patent: Aug. 3, 2021

(54) VERTICAL HOLDER FOR ORAL APPLIANCES

(71) Applicant: Christian Perlee, Middletown, NJ (US)

(72) Inventor: Christian Perlee, Middletown, NJ (US)

(*) Notice: Subject to any disclaimer, the term of this patent is extended or adjusted under 35 U.S.C. 154(b) by 0 days.

(21) Appl. No.: 16/840,396

(22) Filed: Apr. 5, 2020

(65) Prior Publication Data
US 2020/0229911 A1 Jul. 23, 2020

(51) Int. Cl.
*A61C 19/10* (2006.01)

(52) U.S. Cl.
CPC .................... *A61C 19/10* (2013.01)

(58) Field of Classification Search
CPC .......... A61C 19/10; A61C 19/02; A47K 1/09; A45D 44/18; A47F 7/0028
See application file for complete search history.

(56) References Cited

U.S. PATENT DOCUMENTS

| | | | | |
|---|---|---|---|---|
| 374,794 A * | 12/1887 | Kilmer | ............ | A47K 1/09 211/65 |
| 711,690 A | 10/1902 | Zimmer | | |
| 1,464,904 A | 8/1920 | Feldman | | |
| 3,344,930 A * | 10/1967 | Merkel | ............ | A47K 1/09 211/65 |
| 4,600,251 A * | 7/1986 | Zimmerman | .......... | A61C 19/02 108/108 |
| D291,268 S * | 8/1987 | Stephenson | ............ | A46B 17/04 D6/534 |
| 4,927,011 A * | 5/1990 | Wilkinson | ............ | A45D 44/18 206/217 |
| D327,194 S * | 6/1992 | Merkel | ............ | D6/534 |
| 5,125,518 A | 6/1992 | Ward | | |
| 5,398,820 A | 3/1995 | Kiss | | |
| 5,865,325 A | 2/1999 | Comstock | | |
| 6,032,999 A | 3/2000 | York et al. | | |
| 6,189,706 B1 | 2/2001 | Akins | | |
| 6,206,207 B1 | 3/2001 | Kelley | | |
| 6,786,342 B2 * | 9/2004 | Tayebi | ............ | A47K 1/09 211/119.009 |
| D500,221 S * | 12/2004 | Merkel | ............ | D6/534 |
| 6,836,899 B1 | 1/2005 | Glasmire | | |
| D504,587 S * | 5/2005 | Root | ............ | D6/534 |
| 7,063,822 B2 * | 6/2006 | Goertz | ............ | A61C 17/036 206/209.1 |

(Continued)

*Primary Examiner* — Patrick D Hawn
(74) *Attorney, Agent, or Firm* — Moser Taboada

(57) ABSTRACT

An oral appliance hanging device of embodiments of the disclosed technology has a horizontal base supporting vertical walls on top of which are concave indentations opening upwards. Some of the vertical walls can form the upward-facing receptacles and some of the vertical walls can attach to a support base, such as a horizontally-disposed support base. The vertical walls can be spaced apart from each other forming a vertical portal and can include some which are connected only to other vertically disposed walls and some which are connected to the support base. In this manner, liquid can drip on either side or between two vertical walls and on to the support base. Side flanges extending upwards from the horizontal support base and, in some embodiments, forming a unitary structure therewith hold liquid, such as that which drips downwards there-on, until the support base is tilted allowing the liquid to exit or wiped clean.

15 Claims, 7 Drawing Sheets

(56) References Cited

U.S. PATENT DOCUMENTS

| | | | |
|---|---|---|---|
| 7,789,248 B1 | 9/2010 | Salerno et al. | |
| 8,069,998 B2 * | 12/2011 | Thomas | A61L 2/26 |
| | | | 211/85.13 |
| 8,464,868 B2 * | 6/2013 | Kruger | A47B 88/90 |
| | | | 206/362.1 |
| D740,038 S | 10/2015 | Sandgrund | |
| 9,186,229 B2 * | 11/2015 | Vu | A45D 44/18 |
| 9,687,116 B1 * | 6/2017 | Fonseca | A47K 1/09 |
| D822,375 S | 7/2018 | Washington | |
| 2004/0112778 A1 * | 6/2004 | Yang | A47G 7/06 |
| | | | 206/362 |
| 2008/0314789 A1 * | 12/2008 | Thomas | A61B 50/34 |
| | | | 206/572 |
| 2009/0127214 A1 * | 5/2009 | Kruger | A47B 88/90 |
| | | | 211/65 |
| 2009/0242442 A1 * | 10/2009 | Kaddissi | A47K 1/09 |
| | | | 206/362.3 |
| 2010/0181214 A1 * | 7/2010 | Brown | A61C 19/02 |
| | | | 206/63.5 |
| 2011/0315572 A1 * | 12/2011 | Vu | A61C 19/02 |
| | | | 206/216 |
| 2013/0291875 A1 | 11/2013 | Baptiste | |
| 2014/0183146 A1 * | 7/2014 | Feliciano-Perez | A47F 7/02 |
| | | | 211/1 |
| 2014/0284291 A1 | 9/2014 | Sandgrund | |
| 2016/0167943 A1 | 6/2016 | Scanlon | |
| 2018/0243060 A1 | 8/2018 | Wilson | |
| 2019/0178020 A1 | 6/2019 | Moore | |

* cited by examiner

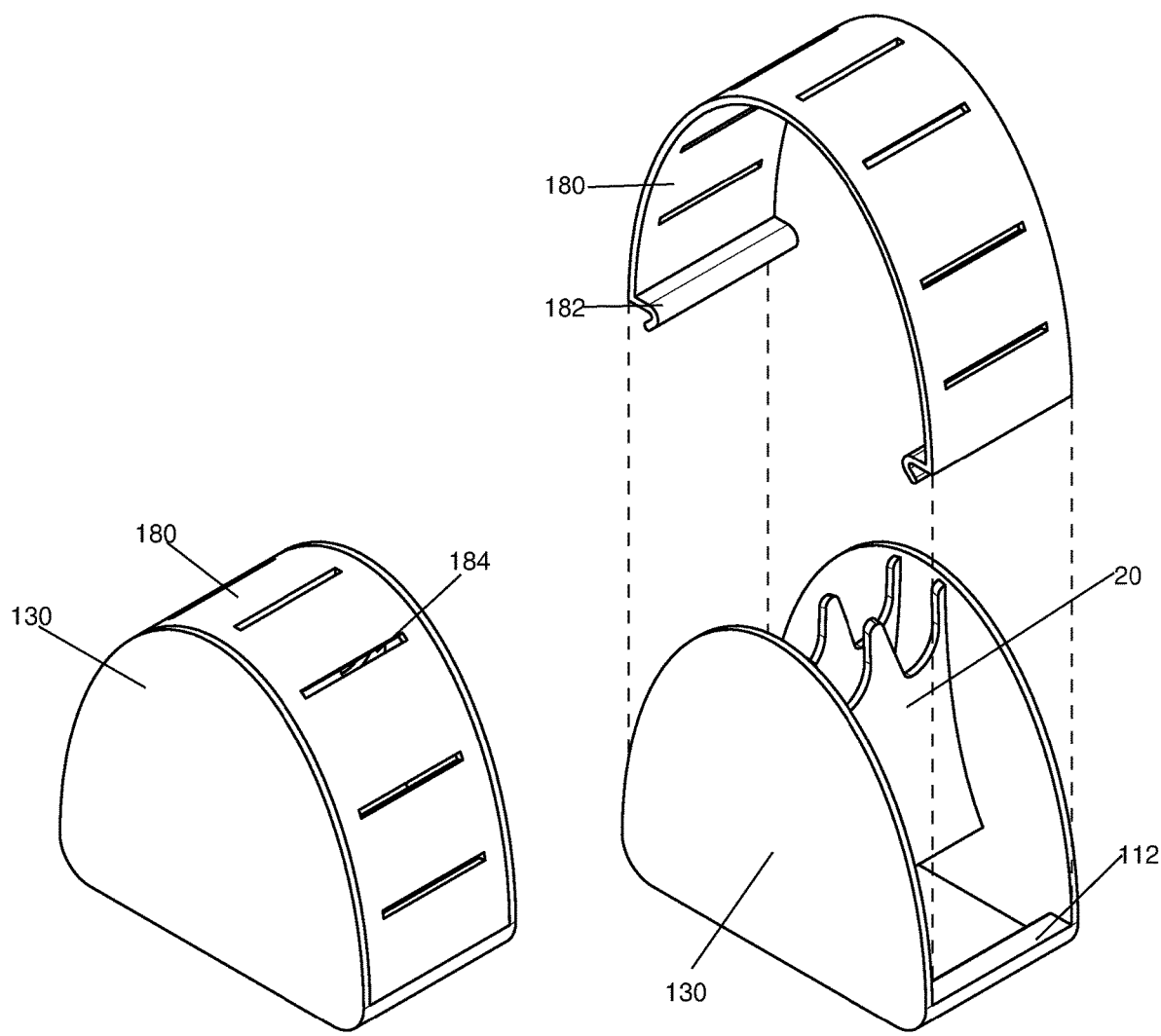
Figure 9                    Figure 10

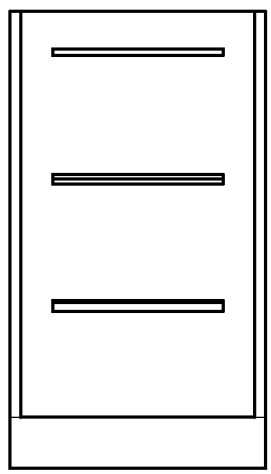
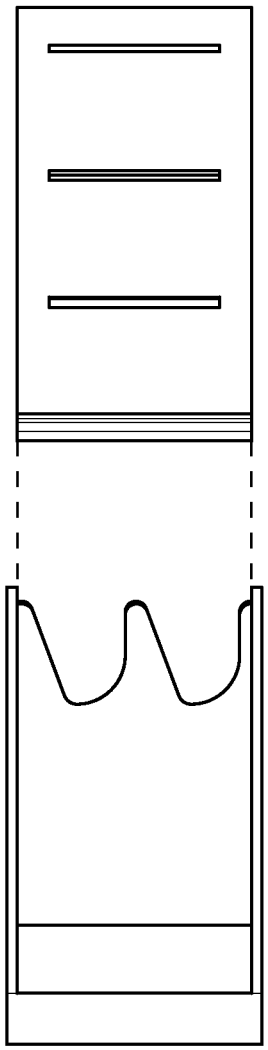
Figure 11                    Figure 12

VERTICAL HOLDER FOR ORAL APPLIANCES

FIELD OF THE DISCLOSED TECHNOLOGY

The disclosed technology relates generally to cases, and more specifically, to a case adapted for an oral appliance.

BACKGROUND

Those who wear retainers, mouthguards, and other oral appliances know that such appliances are important for oral health and, when new, look fresh and clean; but as they are worn, become weathered and appear dirty. Grime from bacteria, food particles, mucous, and so forth almost always builds up on such devices which require frequent, and often difficult, proper cleaning. After use, one typically stores such oral appliances in plastic holders while at or away from home. These plastic holders also develop grime and are often unsanitary because when closed, create a dark, damp storage environment which fosters bacteria growth. Further, liquid can leak from these holders through small ventilation holes, creating a mess on surfaces and continuing a spread of bacteria. In short, both the mouthpiece and holder become what many would term "disgusting" and consider an oral health concern.

Some, out of cleanliness or laziness, avoid use of the holders all together and place their oral appliances directly on a night table or bathroom counter which is unsanitary. This allows dust and other foreign matter to adhere to surfaces of the oral appliance, especially those that are wet. Further, the liquid from the oral appliance, before and after cleaning, leaks on to the counter which can further a spread and growth of bacteria. A sideways-laying oral appliance, such as one left on a counter to dry, may retain liquid and grime in cavities adapted for placement of teeth. This is also problematic from a cleanliness and oral health point of view.

Improvements in the art are needed to decrease bacterial growth, grime, and liquid being retained on and around an oral appliance while allowing an oral appliance to dry completely and be more easily cleaned between uses.

SUMMARY OF THE DISCLOSED TECHNOLOGY

An oral appliance hanging device of embodiments of the disclosed technology has a horizontal base supporting vertical walls on top of which are concave or curvilinear semi-circles, substantially semi-circular, or otherwise formed receptacles which open upwards. Some of the vertical walls can form the upward-facing receptacles and some of the vertical walls can attach to a support base, such as a horizontally-disposed support base. The vertical walls, in embodiments of the disclosed technology can be spaced apart from each other forming a vertical portal and can include some which are connected only to other vertically disposed walls and some which are connected to the support base. In this manner, liquid can drip on either side or between two vertical walls and on to the support base. Side flanges extending upwards from the horizontal support base and, in some embodiments, forming a unitary structure therewith hold liquid, such as that which drips downwards there-on, until the support base is tilted allowing the liquid to exit or wiped clean.

The oral appliance hanging device is adapted, in embodiments of the disclosed technology, to hold an oral appliance or each of two parts of an oral appliance in each of one or two of the upwards-opening receptacles. An oral appliance can be a retainer, dentures, mouthguard, or other substantially semi-circular device such as one adapted to removably fit over teeth and/or in a mouth.

The oral appliance hanging device, in embodiments of the disclosed technology, an oral appliance is gravitationally held in place by a receptacle. "Gravitationally" is defined as "by way of a force exerted by the Earth pulling an object there-towards" and what is commonly referred to as "gravity" or "gravitational force." That is, the oral appliance is held in place by the hanging device, and more specifically, a receptacle thereof. The oral appliance, in turn, hangs below the lowest portion of the receptacle and on either side there-of. A linear distance (straight line between two ends) between an external side (ends) of the oral appliance is less than a distance from one end to another end of the horizontal base in a direction perpendicular to the at least two vertical walls and/or parallel to the horizontal support base. In this manner, any drips (liquid) falling from the oral appliance falls into the support base as the support base is below all of the oral appliance hanging there-above in such embodiments.

The at least two vertical walls have a curved outward slope, in embodiments of the disclosed technology, the sloped region or entirety of the side walls being more narrow at a top side (nearest/at the receptacles) than a bottom side (nearest/at the horizontal base). The top end of the at least two vertical walls/top end of the device has, in some embodiments of the disclosed technology, two perpendicular lines of a symmetry including. Each of these symmetry lines, in such embodiments, is parallel to a plane of the horizontal base, one running between the two receptacles and the other running between the vertical walls.

A removable cover ("removable" being "designed to be attached and detached at least 100 times without substantial or any noticeable degradation to the parts attached/detached from each other") is adapted, in some embodiments of the disclosed technology, to connect to the oral appliance holder. This can be by way of attaching to the horizontal plate on each of four sides thereof and at least substantially an entirety of a curvilinear sides of two or more of the vertical walls. This seals or substantially seals at least most of, or all of, the sides of the oral appliance hanging device. The horizontal base can have upward extending lips on each of at least two or all four sides of a horizontal bottom of the device.

One can use the oral appliance hanging device by setting the device on a surface, such as a flat (perpendicular to a pull of gravity or substantially there-so) surface. An oral appliance adapted to fit top teeth is then placed on a first of two curvilinear concave receptacles and an oral appliance adapted to fit bottom teeth is placed on a second of curvilinear concave receptacle. A lid can be attached to the horizontal base which encloses the oral appliance such that the oral appliance is within the lid. The lid can further attach or abut vertical walls of the oral appliance hanging device.

One can then remove the lid and/or oral appliance hanging device and/or oral appliance(s) from the surface and tilt one or a combination thereof together until liquid there-from exits therefrom, such as exits out of the horizontal base or is wiped clean.

For purposes of this disclosure, directional indicators are relative to a typical use of the device. "Bottom" is opposite "top" and "vertical" is a direction extending perpendicular to a most elongated linear side of a support base to cavities furthest from a gravitational bottom of the device, in embodiments of the disclosed technology.

Any device or step to a method described in this disclosure can comprise or consist of that which it is a part of, or the parts which make up the device or step. The term "and/or" is inclusive of the items which it joins linguistically and each item by itself.

BRIEF DESCRIPTION OF THE DRAWINGS

FIG. 9 shows a cover on the oral appliance hanger of FIG. 5.

FIG. 10 shows the cover ready for covering the oral appliance hanger of FIG. 5.

FIG. 11 shows a side elevation view of the oral appliance hanger of FIG. 9.

FIG. 12 shows a side elevation view of the oral appliance hanger of FIG. 10.

DETAILED DESCRIPTION OF EMBODIMENTS OF THE DISCLOSED TECHNOLOGY

An oral appliance hanger of embodiments of the disclosed technology is used for holding an oral appliance, such as a mouthguard or retainer, by its central region (area adapted for incisors). The oral appliance then hangs down from the hanging device on either side of a vertically oriented holder. This is accomplished by having vertical walls extend upwards from a support base, the vertical walls terminating at a top side with two upward-oriented indentations adapted to fit a part of an oral appliance (e.g. upper, lower) in each of the two up-ward oriented indentations. The vertically oriented walls are solid there-between in some embodiments, and spaced apart in other such that a portal extends between the walls allowing liquid from an oral appliance to fall there-through. The vertical walls can be connected directly to a horizontal support or be spaced there-from and connected by way of another set of vertical walls (e.g. those which are perpendicular thereto) to allow a portal between the vertical walls holding the oral appliance(s) and horizontal base to be created.

These and other embodiments will become clearer following the discussion of the figures.

Figure 1:
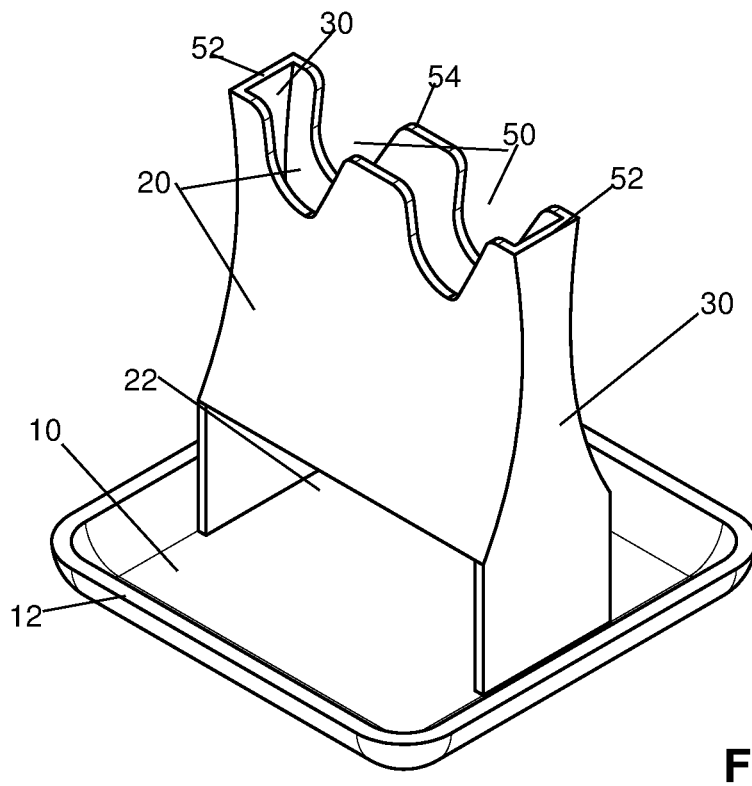
FIG. 1 shows a side perspective view of an oral appliance hanger of an embodiment of the disclosed technology.

FIG. 1 shows a side perspective view of an oral appliance hanger of an embodiment of the disclosed technology. The oral appliance hanger has a horizontal base 10 with upward extending side lips 12 which hold liquid, especially that which drips off an oral appliance held there-above. Vertical walls, such as a first set of vertical walls 30, are connected to, rest upon, or are held against the horizontal base 10. There are two walls 30, though they are referred to by the same label for convenience as, in the embodiment shown in FIG. 1, the walls are identical/mirror images thereof. A second set of vertical walls, such as vertical walls 20 are perpendicular to the vertical walls 30. The vertical walls 20 and 30 are fixedly connected to each other, form a unitary structure together, and/or are otherwise connected. Between one or both sets of vertical walls 20 and/or 30, is a vertically extending portal which extends from the top side of the device, downwards to the horizontal base 10. This allows liquid to drip from an oral appliance down to the horizontal base 10 (drip pan).

It should be understood that directional indicators are relative to one another and/or relative to a typical orientation of the device during use such that the "horizontal" base has a plane of a largest contiguous area in a horizontal plane and the vertical walls have a largest extent and/or substantially longest plane in a perpendicular to the horizontal base. The "top" is a furthest extent of the device from that of the horizontal base and the horizontal base is at the "bottom" and so forth.

Referring still to FIG. 1, the top side of the vertical walls, in some embodiments of the disclosed technology, has one or two spaced apart concave receptacles 50 which are curvilinear, semi-circular indentations, and/or substantially thereof each or a combination of such elements. There can be one or two such concave receptacles. More can also be used, such as to hold more than one set of oral appliances. Two concave receptacles 50 are shown here as, for personal use, one generally would use one such holder/hanging device shown in FIG. 1 per set of oral appliances (e.g. a top retainer/mouthpiece and a bottom retainer/mouthpiece). The concave receptacles 50 cut into, in some embodiments, a topmost edge of the vertical walls 20. The top edge thus a topmost extent thereof on either end 52 (joined with the top of side walls 30, in some embodiments) and a central top most extent 54, the top extends 52 and 54 separated by the concave receptacles 50. The central topmost extent 54 is in two parallel pieces, in embodiments of the disclosed technology with a portal extending in a vertical direction opening down to the horizontal plate 10.

The vertical walls 20 and/or 30 can have a curved exterior side which is narrower/narrowest near, at, or around the concave receptacles 50, and a wider/widest exterior side near or at a lowest end thereof. The lowest end or lowest most end is a part of a vertical wall which joins with a horizontal base and/or is unobtrusively above (has a "line of sight to") the horizontal base 10. The vertical walls 20 can thus slope inwards toward each other when moving (extending) from bottom to top while the vertical walls 30 become narrower in width.

It should also be understood that two lines of symmetry can be present in the oral appliance hanging device. Each of the two lines of symmetry can be perpendicular to each other and a plane of a flat side of the horizontal base 10. A first of these lines of symmetry is equidistant between the side walls 20 in embodiments of the disclosed technology. A second of these lines of symmetry is equidistant between the side walls 30 and/or the concave receptacles in embodiments of the disclosed technology.

Figure 2:
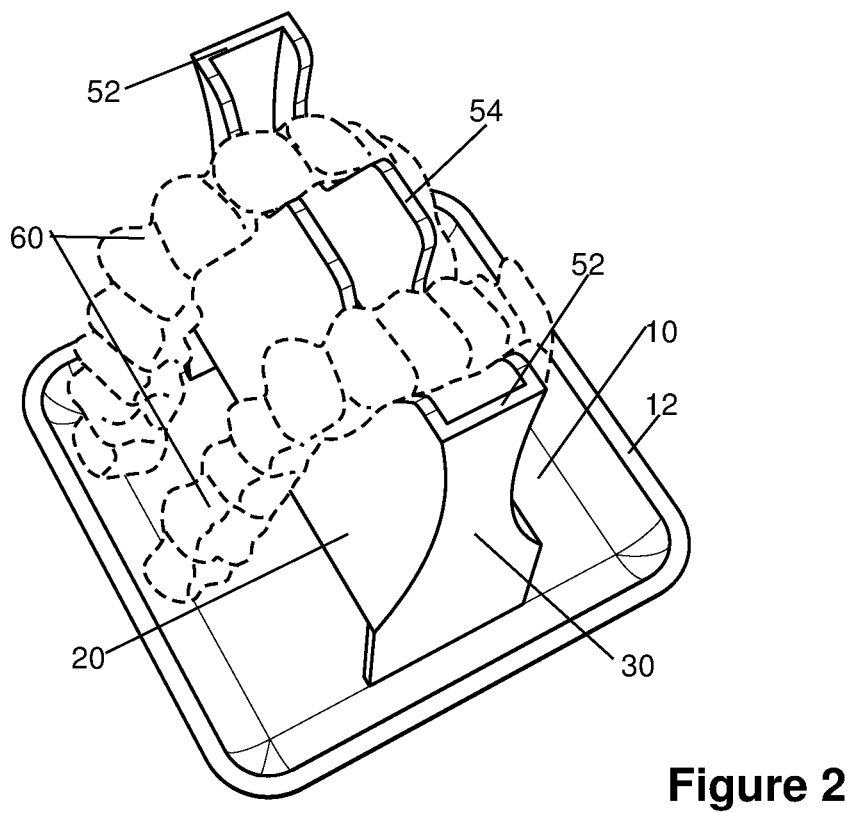
FIG. 2 shows a top perspective view of the oral appliance hanger of FIG. 1.

FIG. 2 shows a top perspective view of the oral appliance hanger of FIG. 1. In this view, one can further appreciate how an oral appliance 60 is held between the top extents 52 and 54 of the vertical walls 30 and 20. At the top of the hanger, between/at the concave receptacle 50 is, in some embodiments, a middle of the oral appliance 60. The "middle" can be one or a plurality of a) an area thereof adapted for incisors, b) an area equidistant to two ends of the device, c) an area equidistant to two ends of the device which is in a middle of an acutely angled substantially curved mouthpiece, and/or d) a center of a longest exterior curved length of the oral appliance. The horizontal plate 10 has a width which is wider than a widest extent of the oral appliance when the oral appliance is hung such that it extends past part of the vertical walls, in some embodiments of the disclosed technology. This is so that liquid dripping therefrom enters into the drip pan which is the horizontal base 10, between the lips 12 and such that, in some embodiments, a cover can be placed over the oral appliance 60 and be removably connected to the lips 12 and/or support base 10.

Figure 3:
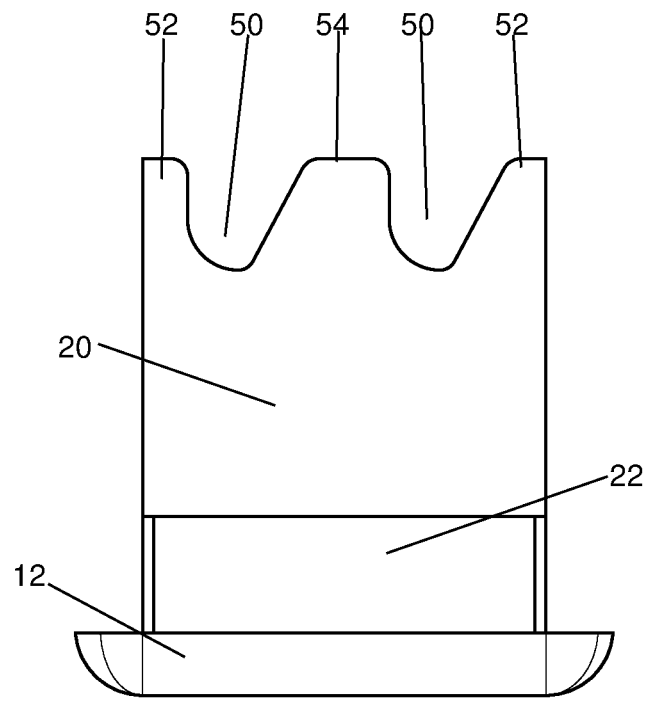
FIG. 3 shows a first elevation view of the oral appliance hanger of FIG. 1.
Figure 4:
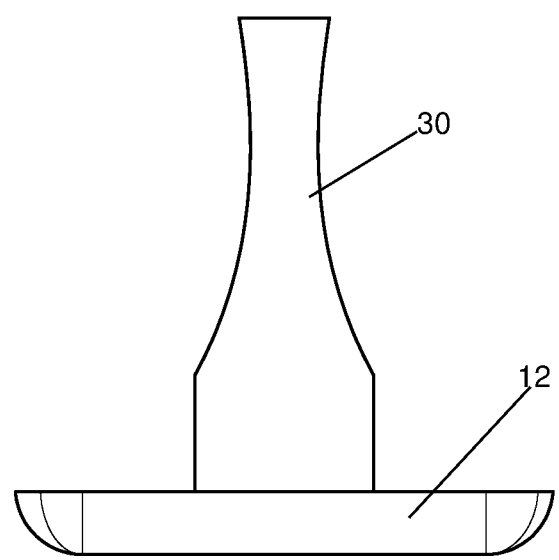
FIG. 4 shows a second elevation view of the oral appliance hanger of FIG. 1.

FIG. 3 shows a first elevation view of the oral appliance hanger of FIG. 1. FIG. 4 shows a second elevation view of the oral appliance hanger of FIG. 1. A portal 22 between the tray 10/lips 12 of the tray and bottom edge of the vertical walls 20 is visible here. The openings into the portal 22 (vertical openings, horizontal extent between the vertical openings) are perpendicular to the openings into a vertically extending portal, the vertically extending portal being between the vertical walls 20 and/or 30. The horizontal and vertical portals join each other in embodiments forming an "invisible" upside down T-shape for the drainage/flow of liquid on to the horizontal base 10.

Figure 5:
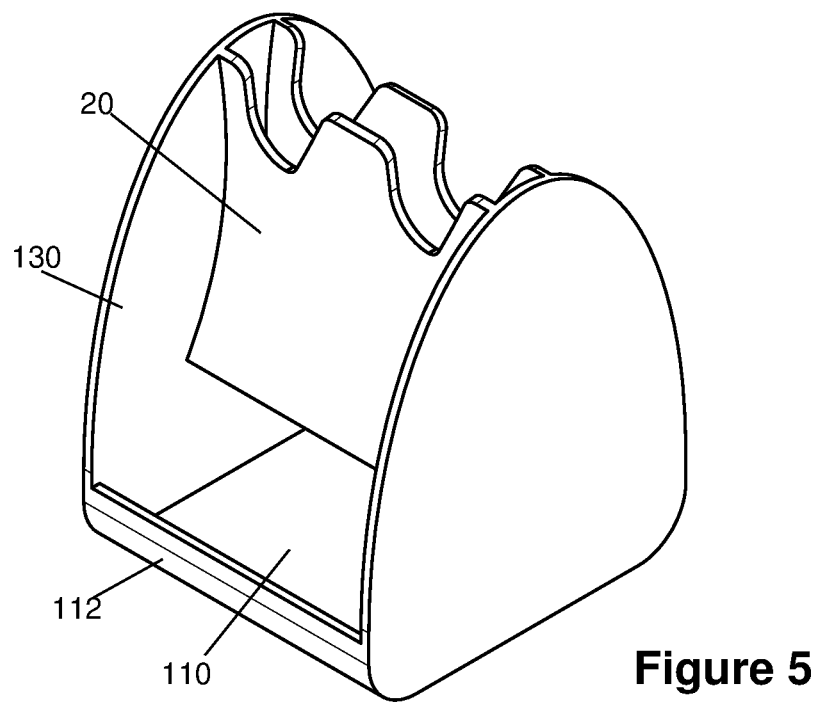
FIG. 5 shows a side perspective view of another embodiment of an oral appliance hanger.

FIG. 5 shows a side perspective view of another embodiment of an oral appliance hanger. In this version elements described/shown in FIG. 1 have been incremented by 100 where the part is an example of an equivalent thereof. The vertical walls 130 in this embodiment are wider than that of the vertical walls 20 in part, most, or all of the horizontal and/or vertical cross-sections thereof. The vertical walls 130 can have curved sides which join at an apex at a topmost extent of the oral appliance hanger.

Figure 6:
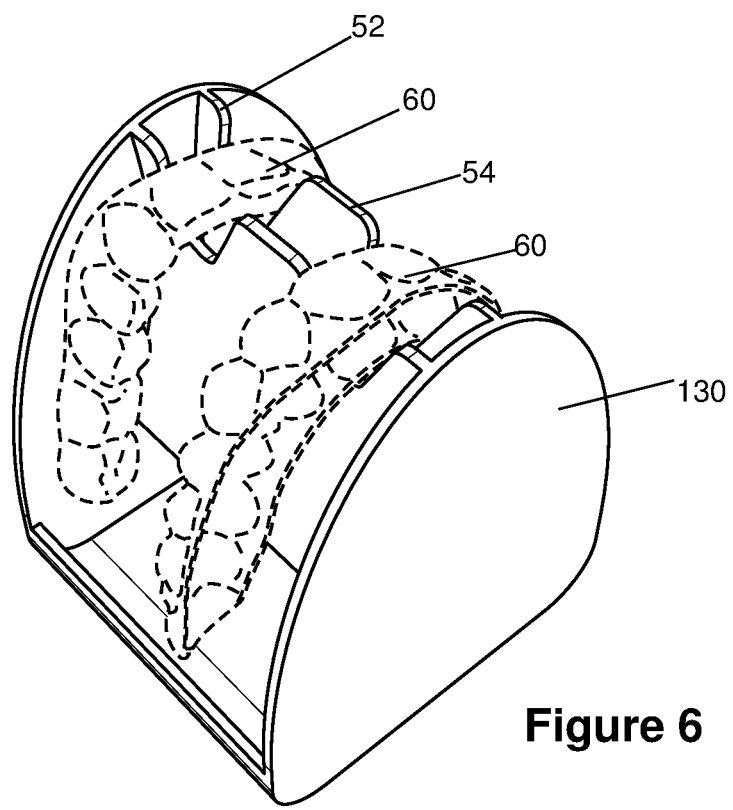
FIG. 6 shows a top perspective view of the oral appliance hanger of FIG. 5.
Figure 7:
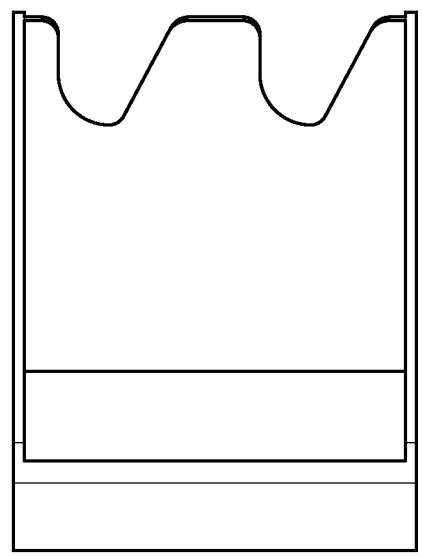
FIG. 7 shows a first elevation view of the oral appliance hanger of FIG. 5.
Figure 8:
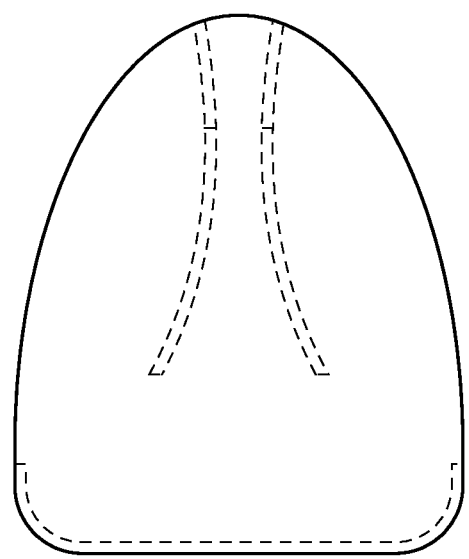
FIG. 8 shows a second elevation view of the oral appliance hanger of FIG. 5.

FIG. 6 shows a top perspective view of the oral appliance hanger of FIG. 5. FIG. 7 shows a first elevation view of the oral appliance hanger of FIG. 5. FIG. 8 shows a second elevation view of the oral appliance hanger of FIG. 5. Here, the outer contour of the oral appliances are within the sloped/curved sides of the vertical walls 130 when the oral appliances 60 are placed into respective concave receptacles 50, between topmost extents of the hanger (between a set of elements 52 and 54). That is, if one were to draw an imaginary horizontal line extending through each side wall 130 at any point along an upper edge thereof, an oral appliance 60 resting on the vertical side wall 20 would fail to cross any of the imaginary horizontal lines in embodiments of the disclosed technology. For purposes of this disclosure, this is defined as "being within", e.g. the oral appliance 60 is within the side walls 130 and outside of the side walls 20.

FIG. 9 shows a cover on the oral appliance hanger of FIG. 5. FIG. 10 shows the cover ready for covering the oral appliance hanger of FIG. 5. The cover 180 has an interior (concave) side which matches an external (convex) side of vertical side walls 130 of the oral appliance hanging device. The cover 180 can then be attached to the horizontal base 10/110 and/or lip 112 such that a seal is closure is created between the cover and vertical side walls 130. Clips 182, such as flexural inward extensions forming a unitary structure with the cover 180, can be pushed past a lip 112 of the hanger/base. In this manner, the cover is held to the base and an oral appliance is situated, in its entirety, such that the oral appliance rests on vertical walls 20 while being encapsulated between vertical walls 130, a base 10/110, and a cover 180.

Figures 13, 14:
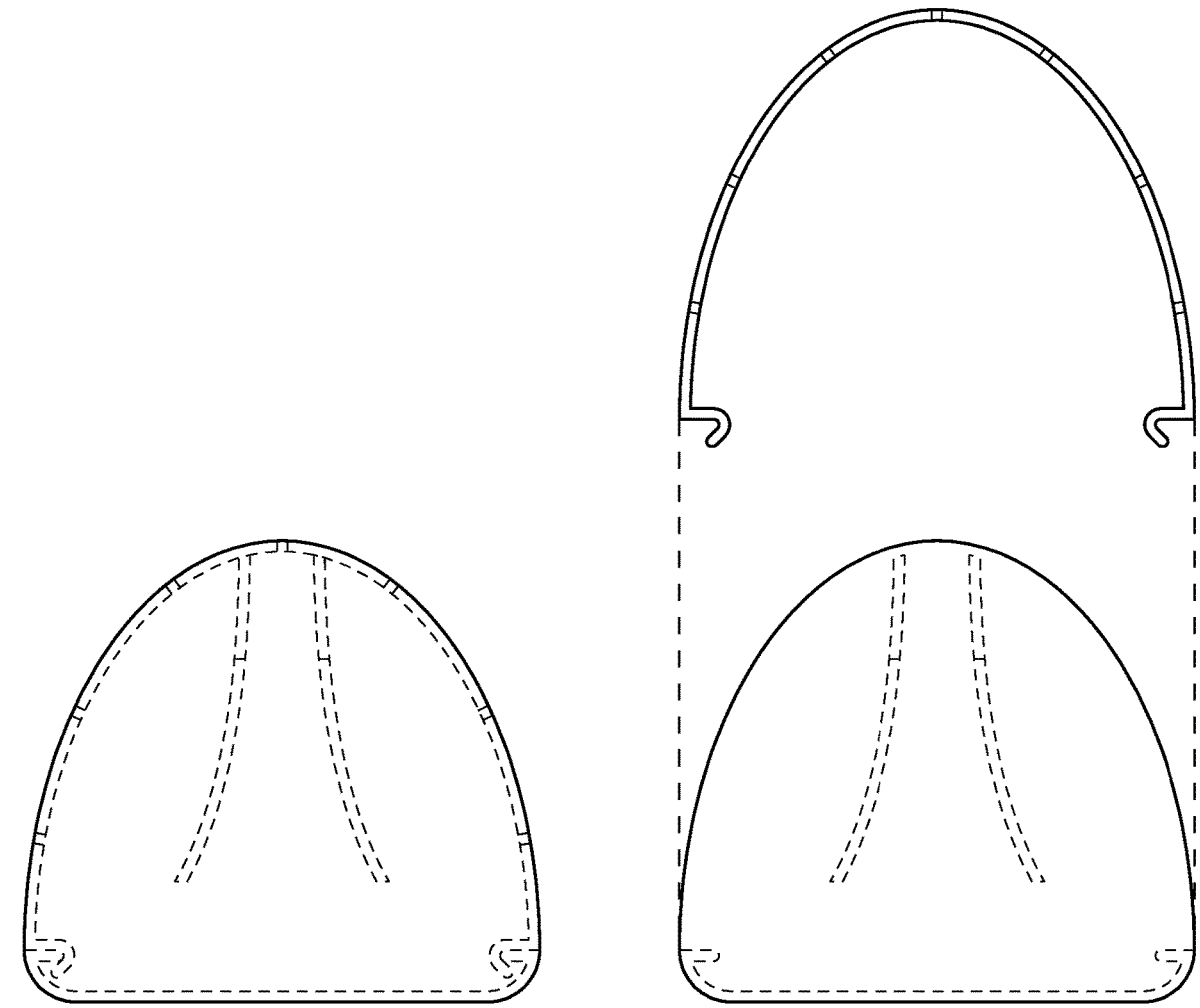
FIG. 13 shows a second side elevation view of the oral appliance hanger of FIG. 9.
FIG. 14 shows a second side elevation view of the oral appliance hanger of FIG. 10.

FIG. 11 shows a side elevation view of the oral appliance hanger of FIG. 9. FIG. 12 shows a side elevation view of the oral appliance hanger of FIG. 10. FIG. 13 shows a second side elevation view of the oral appliance hanger of FIG. 9. FIG. 14 shows a second side elevation view of the oral appliance hanger of FIG. 10. The cover slides "down" (in the orientation shown in FIGS. 11 and 12) to cover the rest of the hanging device as well as an oral appliance itself.

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. An oral appliance holder, comprising:
   a horizontal base;
   one or more receptacles opening in a direction away from said horizontal base and configured to hold one or more mouthpiece-shaped oral appliances in a vertical orientation above the horizontal base proximate a middle of the one or more mouthpiece-shaped oral appliances such that the ends of the one or more mouthpiece-shaped oral appliances extend downward toward the horizonal base;
   at least two vertical walls indirectly fixed to said horizontal base by at least two additional walls perpendicularly disposed to said two vertical walls, wherein said two additional walls have curvilinear sides with an apex at a point furthest from said horizontal base; and
   a removable cover attachable to the horizontal base, wherein when closed, the removable cover creates a seal between curvilinear sides of the at least two additional walls of the oral appliance holder and the horizontal base, wherein the seal is along the entire edges of the horizontal base and all edges of the cover.

2. The oral appliance holder of claim 1, wherein said one or more receptacles comprise one or more curvilinear concave receptacles.

3. The oral appliance holder of claim 1, wherein said at least two vertical walls are separated from said horizontal base by a passageway extending between said at least two vertical walls and said horizontal base.

4. The oral appliance holder of claim 1, wherein said one or more receptacles comprises two curvilinear concave receptacles spaced apart from each other with an open region extending from a top end of said two vertical walls and said two curvilinear concave receptacles to said horizontal base.

5. The oral appliance holder of claim 1, wherein said at least two additional walls comprise a curved outward slope and said at least two additional walls are wider closest to said horizontal base than at a top end of said at least two additional walls.

6. The oral appliance holder of claim 5, wherein said top end of said at least two vertical walls comprises said one or more receptacles.

7. The oral appliance holder of claim 6, wherein said one or more receptacles comprises two curvilinear concave receptacles, and wherein said top end of said at least two additional walls has two perpendicular lines of a symmetry including:
- a first line of symmetry equidistantly spaced between said two curvilinear concave receptacles; and
- a second line of symmetry equidistantly spaced between each of said two additional walls.

8. The oral appliance holder of claim 1, wherein said horizontal base has upwardly extending lips on each of at least two oppositely disposed sides thereof.

9. A method of using said oral appliance holder of claim 1, comprising:
- setting said horizontal base on a surface;
- hanging an oral appliance on a first of said one or more receptacles, wherein a middle of the oral appliance hangs atop the receptacle such that respective ends of the oral appliance extend downward toward the horizonal base; and
- closing the removable cover over the oral appliance to encapsulate the horizontal base and the oral appliance in their entirety, thereby creating the seal between the entire edges of the horizontal base and the entire edges of the cover.

10. The method of claim 9, further comprising attaching the cover to said horizontal base which encloses said oral appliance thereunder.

11. The method of claim 9, further comprising:
- removing said oral appliance from said oral appliance hanging device;
- removing said oral appliance hanging device from said surface; and
- removing liquid disposed on said horizontal base from said horizontal base.

12. An oral appliance holder, comprising:
- one or more upwardly disposed receptacles configured to hold one or more wearable oral appliances in a vertical orientation at a middle of each the one or more oral appliances;
- vertically extending walls supporting said one or more upwardly disposed receptacles above a horizontal base; wherein said vertically extending walls are indirectly fixed to said horizontal base by at least two additional walls perpendicularly disposed to said vertically extending walls, wherein said two additional walls have curvilinear sides with an apex at a point furthest from said horizontal base;
- a portal disposed between said vertically extending walls and adjacent said one or more upwardly disposed receptacles, wherein the portal is an uninterrupted opening that extends from a top side of the vertically extending walls downward to the horizontal base; and
- a removable cover attachable to the horizontal base, wherein when closed, the removable cover encapsulates the horizontal base and the oral appliances in their entirety such that a seal is created between the cover, the walls of the oral appliance holder, and where the cover meets the horizontal base.

13. The oral appliance holder of claim 12, wherein the horizontally disposed base includes upwardly extending lips on sides thereof, said vertically extending walls attached to said horizontally disposed base.

14. The oral appliance holder of claim 13, wherein said one or more upwardly disposed receptacles comprises two spaced apart upwardly disposed receptacles disposed in-line with each other.

15. The oral appliance holder of claim 14, wherein each of said two spaced apart upwardly disposed receptacles has two spaced apart concave curved sides.

* * * * *